United States Patent
Mayer et al.

(10) Patent No.: US 7,310,569 B2
(45) Date of Patent: Dec. 18, 2007

(54) METHOD FOR CONTROLLING ELECTRONIC PARCEL COMPARTMENT SYSTEMS

(75) Inventors: Boris Mayer, Bonn (DE); Clemens Günther, Bonn (DE)

(73) Assignee: Deutsche Post AG, Bonn (DE)

( * ) Notice: Subject to any disclaimer, the term of this patent is extended or adjusted under 35 U.S.C. 154(b) by 235 days.

(21) Appl. No.: 10/820,974

(22) Filed: Apr. 8, 2004

(65) Prior Publication Data

US 2004/0260830 A1    Dec. 23, 2004

Related U.S. Application Data

(63) Continuation of application No. PCT/DE02/03758, filed on Oct. 7, 2002.

(30) Foreign Application Priority Data

Oct. 9, 2001    (DE)    ............... 101 49 619

(51) Int. Cl.
*G06F 17/00*    (2006.01)
(52) U.S. Cl. .............. 700/241; 700/242; 700/237
(58) Field of Classification Search .............. 700/242, 700/241, 244, 237, 236, 232, 243; 705/26
See application file for complete search history.

(56) References Cited

U.S. PATENT DOCUMENTS 4,894,717 A * 1/1990 Komei .................. 348/150
5,231,272 A * 7/1993 Mardon .................. 235/382
5,233,343 A * 8/1993 Mazzoni .................. 340/5.33
5,475,378 A * 12/1995 Kaarsoo et al. ............. 340/5.6
5,734,907 A * 3/1998 Jarossay et al. ............. 717/141
6,010,064 A * 1/2000 Umeda et al. ............. 235/375

FOREIGN PATENT DOCUMENTS

| DE | 196 41 005 A1 | 12/1998 |
| DE | 197 28 885 A1 | 1/1999 |
| DE | 100 00 830 A1 | 7/2001 |
| DE | 100 00 830 C2 | 7/2001 |
| WO | WO 00/51750 | 9/2000 |
| WO | WO 01/31593 | 5/2001 |
| WO | WO 01/63494 A2 | 8/2001 |

OTHER PUBLICATIONS

International Preliminary Examination Report in PCT/DE02/03758 dated Oct. 30, 2003.

* cited by examiner

*Primary Examiner*—Gene O. Crawford
*Assistant Examiner*—Timothy Waggoner
(74) *Attorney, Agent, or Firm*—Marshall, Gerstein & Borun LLP

(57) ABSTRACT

Disclosed herein are a method for controlling electronic parcel compartment systems and an interface for carrying out the method. According to the disclosed method, data for controlling the electronic parcel compartment systems are stored on a server and are converted into control commands for controlling the compartment systems. Furthermore, according to the disclosed method, the control commands are transmitted to the parcel compartment systems via an interface.

30 Claims, No Drawings

METHOD FOR CONTROLLING ELECTRONIC PARCEL COMPARTMENT SYSTEMS

CROSS-REFERENCE TO RELATED APPLICATION

This is a continuation of international Application No. PCT/DE02/03758 filed Oct. 7, 2002, the disclosure of which is incorporated herein by reference.

BACKGROUND OF THE DISCLOSURE

1. Field of the Disclosure

The disclosure generally relates to a method for controlling electronic parcel package compartment systems.

2. Brief Description of Related Technology

International Publication No. WO 01/63494 A2 discloses a computer-controlled system for delivering goods in which one or more locker systems are connected to a server that administers and provides the processes and data for the ordering of goods, their delivery, and the operation of the locker system.

SUMMARY OF THE DISCLOSURE

Disclosed herein is a method operable such that a flexible and simple adaptation of an electronic parcel compartment system is made possible. In particular, the method allows a quick and reliable change of the operating parameters of the parcel compartment system.

Accordingly, a method for controlling electronic parcel compartment systems is carried out in such a way that a checking procedure is carried out in the area of the server to see whether changes have been made to the data stored in the server and in that control commands are transmitted via an interface to the parcel compartment system as soon as a predefinable number of changes have been made to the data stock.

The method includes determining whether a predefinable number of changes have been made to the data stored in a server, and transmitting control commands to a parcel compartment system via an interface when a predefinable number of changes have been made to the data.

The disclosed method, thus, entails centralization and harmonization of the control commands for the parcel compartment systems. The interface provided for this centralization allows a virtually real-time transmission of the control commands to the parcel compartment systems.

Additional features of the disclosure may become apparent to those skilled in the art from a review of the following detailed description, taken in conjunction with the example, and the appended claims.

DETAILED DESCRIPTION

The disclosed method makes it possible to achieve harmonized operating conditions for a plurality of electronic parcel compartment systems and to change these operating conditions on short notice. This dynamic change can relate to access rights of individual users or user groups as well as to operating parameters of the electronic parcel compartment system.

In an embodiment in which the control commands change operating parameters of the electronic parcel compartment system, preferably the entire configuration of the parcel compartment systems can be changed. In this manner, for example, pick-up time periods for individual users and/or user groups can be changed centrally.

Furthermore, it is advantageous for the control commands to act upon an electronic control unit located in the area of the electronic parcel compartment system in such a way that the selection of the available operating functions is changed. Moreover, it is advantageous for the control commands for controlling the parcel compartment systems to change properties of the graphic user interface. Advantageously, this embodiment of the invention is carried out in such a way that a selection option of menu items of the graphic user interface is changed by the control commands.

In order to achieve an especially flexible and reliable transmission of the control commands, it is advantageous for the control commands to be transmitted in accordance with an XML protocol. As a matter of principle, control commands between the parcel compartment system and the server are transmitted in a push-oriented or pull-oriented manner.

In an advantageous embodiment, the electronic parcel compartment systems send to the interface a request for the transmission of the control commands. Here, it is advantageous for the request for the transmission of the control commands to be repeated when an event occurs. It is likewise advantageous for the request to be repeated after a predefinable time interval.

In an especially preferred embodiment of the method, a checking procedure is carried out in the area of the server to see whether changes have been made to the data stored in the server and, if changes have been made to the data stored in the server, then control commands are transmitted to the parcel compartment systems. In this manner, a comprehensive transmission of control commands can be achieved. Moreover, the requisite volume of data traffic is reduced. In order to further reduce the data traffic, it is advantageous for the control commands to be transmitted as soon as a predefinable number of changes have been made to the data stock. Moreover, it is advantageous for the parcel compartment systems to also send data to the server.

The interface that transmits the control commands for the parcel compartment systems to the parcel compartment systems as well as another interface are suitable for transferring the data from the parcel compartment systems to the server. Advantageously, the server converts the transferred data into control commands for controlling the parcel compartment systems.

The measures depicted can further increase the reliability of the parcel compartment systems and of the method. This is especially the case because, if instances of misuse occur at one of the parcel compartment systems, the appertaining data is transmitted to the server and subsequently converted into control commands for all of the parcel compartment systems.

The subject matter of the disclosure is also directed to an interface that is configured in such a way that it comprises a data input to receive data for controlling electronic parcel compartment systems and/or for transmitting control commands to the parcel compartment systems as well as a means for transferring the data and/or the control commands to the parcel compartment systems.

EXAMPLE

The following example is directed to an especially preferred embodiment in which data communication is established between the server and the parcel compartment systems as well as between the parcel compartment systems and the server. This example is especially preferred because it allows an even greater flexibility of the method.

In the server or in another data processing unit, data events are evaluated and converted into control commands.

In the depicted embodiment of the especially preferred bidirectional data transmission between the parcel compartment systems and the server, it is possible for the parcel compartment systems to request a transmission of control commands from the parcel compartment system.

Preferably, the server employed is a web server that is capable of transmitting the data transfer commands in accordance with the http protocol. Requests for the transmission of control commands are transmitted to the server, for example, as XML files. The names and functions of individually employed data are compiled in the table, below.

TABLE

| Data | Function |
|---|---|
| UserID | User name |
| AccountID | Name of the user account |
| SecurityToken | Password for the access authorization |
| Language | Language for transmitting error messages, these languages can be freely selected and include, for example, German and English |
| ProcessingMode (default is MODULE) | Contains the encoded mode of the placement or pick-up of the parcel |
| RequestID | Identification data regarding the request for the transmission of control commands |

Preferably, the data is transferred in a suitable format or with a suitable encryption, for example, in accordance with the ISO 8859 1 standard. XML (W3C) allows the use of the following data types:

ASCII Value 0x0009 (Tab)

ASCII Value 0x000A (Newline)

ASCII Value 0x000C (Carriage Return)

ASCII Values 0x0020-0xD7FF and 0xE000-0xFFFD (Printable Characters)

The advantages of an interface that is limited to predefined or predefinable data types lie in the fact that it is universally deployable, expandable, and independent of the manufacturer.

The foregoing description is given for clearness of understanding only, and no unnecessary limitations should be understood therefrom, as modifications within the scope of the disclosure may be apparent to those having ordinary skill in the art.

What is claimed is:

1. A method for controlling a plurality of electronic parcel package compartment systems, the method comprising the steps of:
   (a) determining whether a predefinable number of changes have been made to data stored in a server;
   (b) transmitting control commands to a parcel compartment system via an interface when a predefinable number of changes have been made to the data, and wherein the control commands change properties of a graphic user interface;
   (c) transmitting data appertaining to a misuse from one parcel compartment system to the server;
   (d) converting the data appertaining to the misuse into control commands appertaining to the misuse in the server; and
   (e) transmitting the control commands in step (d) to all parcel compartment systems.

2. The method of claim 1, wherein the control commands in step (b) change a selection option of menu items of the graphic user interface.

3. The method of claim 1, wherein the transmitting step (b) is carried out in accordance with an XML protocol.

4. The method of claim 1, further comprising the step of: sending to the interface a request to transmit the control commands in step (b).

5. The method of claim 4, further comprising repeating the sending step when an event occurs.

6. The method of claim 5, wherein sending step is repeated after a predefinable time interval.

7. A method for controlling a plurality of electronic parcel package compartment systems, the method comprising the steps of:
   (a) determining whether a predefinable number of changes have been made to data stored in a server;
   (b) transmitting control commands to a parcel compartment system via an interface in accordance with an XML protocol when a predefinable number of changes have been made to the data;
   (c) transmitting data appertaining to a misuse from one parcel compartment system to the server;
   (d) converting the data appertaining to the misuse into control commands appertaining to the misuse in the server; and
   (e) transmitting the control commands in step (d) to all parcel compartment systems.

8. The method of claim 7, wherein the control commands in step (b) change operating parameters of the electronic parcel compartment system.

9. The method of claim 7, wherein the control commands in step (b) act upon an electronic control unit located in the electronic parcel compartment system to change available operating functions.

10. The method of claim 9, wherein the available operating functions comprise a possibility to open parcel compartments.

11. The method of claim 7, wherein the control commands in step (b) change a selection option of menu items of the graphic user interface.

12. The method of claim 7, further comprising the step of: sending to the interface a request to transmit the control commands in step (b).

13. The method of claim 12, further comprising repeating the sending step when an event occurs.

14. The method of claim 13, wherein sending step is repeated after a predefinable time interval.

15. The method of claim 7, further comprising the step of transmitting data to the server via the parcel compartment systems.

16. A method for controlling a plurality of electronic parcel package compartment systems, the method comprising the steps of:
   (a) determining whether a predefinable number of changes have been made to data stored in a server;
   (b) transmitting control commands to a parcel compartment system via an interface when a predefinable number of changes have been made to the data;
   (c) sending to the interface a request to transmit the control commands;
   (d) transmitting data appertaining to a misuse from one parcel compartment system to the server;
   (e) converting the data appertaining to the misuse into control commands appertaining to the misuse in the server; and (f) transmitting the control commands in step (e) to all parcel compartment systems.

17. The method of claim 16, wherein the control commands in step (b) change operating parameters of the electronic parcel compartment system.

18. The method of claim 16, wherein the control commands in step (b) act upon an electronic control unit located in the electronic parcel compartment system to change available operating functions.

19. The method of claim 18, wherein the available operating functions comprise a possibility to open parcel compartments.

20. The method of claim 16, wherein the control commands in step (b) change a selection option of menu items of the graphic user interface.

21. The method of claim 16, further comprising repeating the sending step (c) when an event occurs.

22. The method of claim 16, wherein sending step (c) is repeated after a predefinable time interval.

23. The method of claim 16, further comprising the step of transmitting data to the server via the parcel compartment systems.

24. A method for controlling a plurality of electronic parcel package compartment systems, the method comprising the steps of:
   (a) determining whether a predefinable number of changes have been made to data stored in a server; and,
   (b) transmitting control commands to a parcel compartment system via an interface when a predefinable number of changes have been made to the data;
   (c) transmitting data to the server via the parcel compartment system, wherein the server converts the transmitted data into control commands for controlling the parcel compartment system;
   (d) transmitting data appertaining to a misuse from one parcel compartment system to the server;
   (e) converting the data appertaining to the misuse into control commands appertaining to the misuse in the server; and
   (f) transmitting the control commands in step (e) to all parcel compartment systems.

25. The method of claim 24, wherein the control commands in step (b) change operating parameters of the electronic parcel compartment system.

26. The method of claim 24, wherein the control commands in step (b) act upon an electronic control unit located in the electronic parcel compartment system to change available operating functions.

27. The method of claim 26, wherein the available operating functions comprise a possibility to open parcel compartments.

28. The method of claim 24, wherein the control commands in step (b) change a selection option of menu items of the graphic user interface.

29. The method of claim 24, further comprising the step of sending to the interface a request to transmit the control commands in step (b), and repeating the sending step when an event occurs.

30. The method of claim 29, wherein sending step is repeated after a predefinable time interval.

* * * * *